(12) United States Patent
Bossecker et al.

(10) Patent No.: US 12,136,858 B2
(45) Date of Patent: Nov. 5, 2024

(54) AXIAL FLUX MACHINE

(71) Applicant: Schaeffler Technologies AG & Co. KG, Herzogenaurach (DE)

(72) Inventors: Maximilian Bossecker, Hügelsheim (DE); Holger Witt, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 320 days.

(21) Appl. No.: 17/763,313

(22) PCT Filed: Aug. 25, 2020

(86) PCT No.: PCT/DE2020/100736
§ 371 (c)(1),
(2) Date: Mar. 24, 2022

(87) PCT Pub. No.: WO2021/058052
PCT Pub. Date: Apr. 1, 2021

(65) Prior Publication Data
US 2022/0368202 A1    Nov. 17, 2022

(30) Foreign Application Priority Data
Sep. 25, 2019   (DE) ............... 10 2019 125 871.5

(51) Int. Cl.
*H02K 21/24* (2006.01)
*H02K 1/18* (2006.01)
*H02K 1/32* (2006.01)

(52) U.S. Cl.
CPC ............ *H02K 21/24* (2013.01); *H02K 1/182* (2013.01); *H02K 1/32* (2013.01)

(58) Field of Classification Search
CPC .......... H02K 21/24; H02K 1/182; H02K 1/32
USPC .................... 310/156.02, 266–268
See application file for complete search history.

(56) References Cited

U.S. PATENT DOCUMENTS

| | | | |
|---|---|---|---|
| 6,304,011 B1 * | 10/2001 | Pullen | H02K 21/24 310/58 |
| 9,287,755 B2 | 3/2016 | Woolmer et al. | |
| 9,496,776 B2 | 11/2016 | Woolmer et al. | |
| 2017/0047821 A1 * | 2/2017 | Klassen | H02K 1/2783 |

FOREIGN PATENT DOCUMENTS

| | | |
|---|---|---|
| CN | 101409475 A | 4/2009 |
| CN | 101425707 A | 5/2009 |
| CN | 102365810 A | 2/2012 |
| CN | 204012963 U | 12/2014 |
| CN | 105379072 A | 3/2016 |
| CN | 106471718 A | 3/2017 |
| CN | 208674971 U | 3/2019 |
| CN | 209434975 U | 9/2019 |

(Continued)

*Primary Examiner* — Jose A Gonzalez Quinones

(57) ABSTRACT

An axial flux machine having a stator which is located between a first rotor disk and a second rotor disk. The base part of the stator is a central support flange which defines a first lateral face and a second lateral face. The central support flange has a plurality of flow openings. A first, left stator cover is mounted, with a formed collection channel, on the first lateral face of the support flange, and a second, right stator cover is mounted, with a formed distribution channel, on the second lateral face of the support flange.

9 Claims, 19 Drawing Sheets

(56) References Cited

FOREIGN PATENT DOCUMENTS

| | | |
|---|---|---|
| DE | 102005023492 A1 | 12/2006 |
| DE | 102014221648 A1 | 4/2016 |
| JP | 2009142095 A | 6/2009 |
| JP | 2017060281 A | 3/2017 |
| JP | 2017099181 A | 6/2017 |
| WO | 2019171318 A1 | 9/2019 |
| WO | 20119171318 A1 | 9/2019 |
| WO | 2021032236 A1 | 2/2021 |

* cited by examiner

AXIAL FLUX MACHINE

CROSS-REFERENCE TO RELATED APPLICATIONS

This application is the U.S. National Phase of PCT Appln. No. PCT/DE2020/100736 filed Aug. 25, 2020, which claims priority to DE 10 2019 125 871.5 filed Sep. 25, 2019, the entire disclosures of which are incorporated by reference herein.

TECHNICAL FIELD

The disclosure relates to an axial flux machine (electric motor). The axial flux machine has a stator that is located between a first rotor disk and a second rotor disk.

BACKGROUND

The German patent application DE 10 2005 023 492 A1 discloses a disk rotor for a flat motor for driving an adjustment device in a motor vehicle. The flat motor is provided with an armature disk, which has a coil system and is designed and provided for interaction with permanent magnets of a stator of the flat motor. A commutator is connected to the coil system of the armature disk in the radial direction inwards.

The German patent application DE 10 2014 221 648 A1 discloses an electrical machine which can be designed in particular as a disk rotor. Heat-generating components, such as coils, are provided on the stator of the electrical machine. A rotor is rotatable relative to the stator and spaced apart therefrom by an air gap. The cooling channel arrangement has a cooling channel through which a cooling fluid can be made to flow in the circumferential direction along the stator. The cooling arrangement extends along an outer surface of the heat-generating components of the stator. The cooling channel arrangement is designed in two parts, wherein a first part can consist, for example, of a die-cast component made of metal with good thermal conductivity and can be closed with a second component acting as a cover. Webs or turbulence elements inside the cooling channel can ensure improved cooling performance.

According to the prior art, a cooling concept for an axial flux machine can be implemented in such a way that the iron cores, which represent the laminated cores for the coils, are composed of two halves. The iron core halves are enclosed between an outer and an inner retaining ring to form a unit. This is done either by laser welding and/or by means of complex adhesive joints.

SUMMARY

The object of the disclosure is to create an axial flux machine which enables optimal coil cooling and thus high power density (high current) for its operation and at the same time provides a simplified design of the axial flux machine which is also more cost-effective.

The above object is achieved by an axial flux machine comprising the features described herein.

The axial flux machine according to the disclosure has a stator that is located between a first rotor disk and a second rotor disk. Each of the rotor disks carries permanent magnets, which are designed in the form of annular segments and face the stator. A central support flange is provided that defines a first lateral face and a second lateral face. The support flange divides the stator into a first stator half and a second stator half. Furthermore, the support flange has formed flow openings that lead from the second stator half to the first stator half A first, left stator cover is mounted on the first lateral face of the support flange. The first, left stator cover has a collection channel formed on the outer circumference. A second, right stator cover is mounted on the second lateral face of the support flange. The second, right stator cover has a distribution channel formed on the outer circumference. A cooling agent flow is defined from the distribution channel through the flow openings to the collection channel.

The advantage is that with the design of the axial flux machine according to the disclosure, optimal cooling of the windings of the coils is achieved. This enables a high power density (high current) for the operation of the axial flux machine. In addition, the disassembly of the axial flux machine is simplified.

A plurality of iron cores are held on the support flange that extend equally into the first stator half and the second stator half Each of the iron cores is surrounded by a wound coil in the first stator half and the second stator half in such a way that the coils arranged consecutively in the radial direction are each spaced apart from one another by a gap. The distribution channel of the second, right stator cover, the gaps between the consecutive coils of the second stator half, the flow openings in the support flange, the gaps between the consecutive coils of the first stator halves, and the collection channel of the first, left stator cover are in fluidic communication with one another.

The advantage of the structure according to the disclosure is that a cold coolant (such as oil) reaches the second half of the interior of the stator via the inlet connection of the second, right stator cover. The circumferential distribution channel of the second, right stator cover ensures that the "fresh" coolant reaches all coils in equal measure.

The design of the axial flux machine provides that each coil is spaced apart from its neighboring coil, so that there is always a gap between two coils. The cooling medium now flows through these gaps from radially outside to radially inside. Arriving radially on the inside, the coolant flow reaches the first stator half via the flow opening provided in the central support flange, from where it flows radially outwards again through the gaps between the coils of the first stator half. The meanwhile heated cooling medium then reaches the return connection via the collection channel.

According to a possible embodiment of the disclosure, the central support flange can have formed a plurality of annular segment-like window cutouts. The window cutouts are separated from one another by webs and are distributed uniformly around a central opening for a hub of the stator. The iron cores, which are designed according to one possible embodiment in the manner of annular segments, are held centrally in the support flange via the webs by means of a groove.

According to the disclosure, the central element of the stator is the support flange with the continuous iron cores arranged on it. The iron cores will enter into a form fit with their grooves and the webs of the support flange. Due to the design, the coils which are arranged in the first stator half and the second stator half are therefore divided. The groove can be provided with an insulator.

According to a further possible embodiment of the disclosure, the support flange with the mounted iron cores is overmolded with a plastic. This fixes the iron cores in the support flange. As a result of the overmolding, the plastic rests on both sides of an outer ring, with both sides of the webs and with both sides of an inner ring of the support flange. The plastic also rests on an upper lateral face, a lower lateral face and lateral side faces of the iron core. The flow openings on the inner ring are left exposed by the plastic.

According to a preferred embodiment, each of the wound coils can have an annular segment-like shape that surrounds the annular segment-like iron cores that are overmolded with plastic. As already mentioned, the radially consecutively arranged coils define the gap which communicates with one of the many flow openings in the inner ring of the support flange. It is particularly advantageous if the coils, the associated phase rings and the phase connections form a preassembled module. This module then only needs to be pushed onto the iron cores on both sides of the support flange.

According to a further possible embodiment of the disclosure, the first, left stator cover and the second, right stator cover can have a plurality of sealing geometries in the form of elastomer seals. The first circumferential elastomer seal is provided in the area of the outer circumference of the two stator covers. The second circumferential elastomer seal is provided in the area of an opening for the hub. A further elastomer seal is formed in each of the phase connection receptacles. A plurality of screw connections extending through the central support flange press the first, left stator cover and the second, right stator cover against each other onto the central support flange.

According to a further embodiment of the axial flux machine, a further sealant can be provided, which surrounds the cutouts of the first, left stator cover and of the second, right stator cover, which are defined by spokes.

The axial flux machine described in the present patent application is constructed with regard to absolute tightness (e.g., for a dry application).

If such an axial flux machine were to be integrated into a wet area (e.g., in the transmission), the transmission oil can be used as a cooling medium at the same time. In this application, many of the seals and the adhesive joints of the stator covers could be omitted. The axial flux machine would then have certain leaks, but the targeted flow path of the cooling medium through the interior of the stator would be retained.

According to a possible further embodiment, the axial flux machine can be designed as a stand-alone solution. This means that the rotor disks are centered both axially and radially over the stator by means of ball bearings. The output or transmission input shaft can thus also be mounted via the bearings of the axial flux machine.

However, if the transmission input shaft has its own bearing, the two rotor disks would already be radially centered by the shaft. In this case, the rotor disks would only have to be mounted axially with respect to the stator, i.e., to the support flange, in order to maintain the air gap on both sides between the magnets of the rotor disks and the iron core. This can be achieved by plugging, in an axial bearing between each of the left and right rotor disks and the support flange. The required bearing sleeve can then be omitted.

BRIEF DESCRIPTION OF THE DRAWINGS

With reference to the accompanying drawings, the disclosure and its advantages will now be explained in more detail by means of exemplary embodiments, without thereby limiting the disclosure to the exemplary embodiment shown. The proportions in the figures do not always correspond to the real proportions, since some shapes are simplified and other shapes are shown enlarged in relation to other elements for better illustration.

DETAILED DESCRIPTION

Identical reference symbols are used for elements of the disclosure that are the same or have the same effect. Furthermore, for the sake of clarity, only reference symbols are shown in the individual figures that are necessary for the description of the respective figure. The figures merely represent exemplary embodiments of the disclosure without, however, restricting the disclosure to the exemplary embodiments shown. The figures shown do not claim the completeness of the structure of an axial flux machine (electric motor). Thus, e.g., no speed sensors are shown, which usually "read off" the angular position and direction of rotation of at least one of the rotor disks in order to then be able to control the motor in a suitable manner. Also, no additional insulation material is shown (such as electrically insulating foil between the individual phase rings to prevent arcing).

Figure 1:
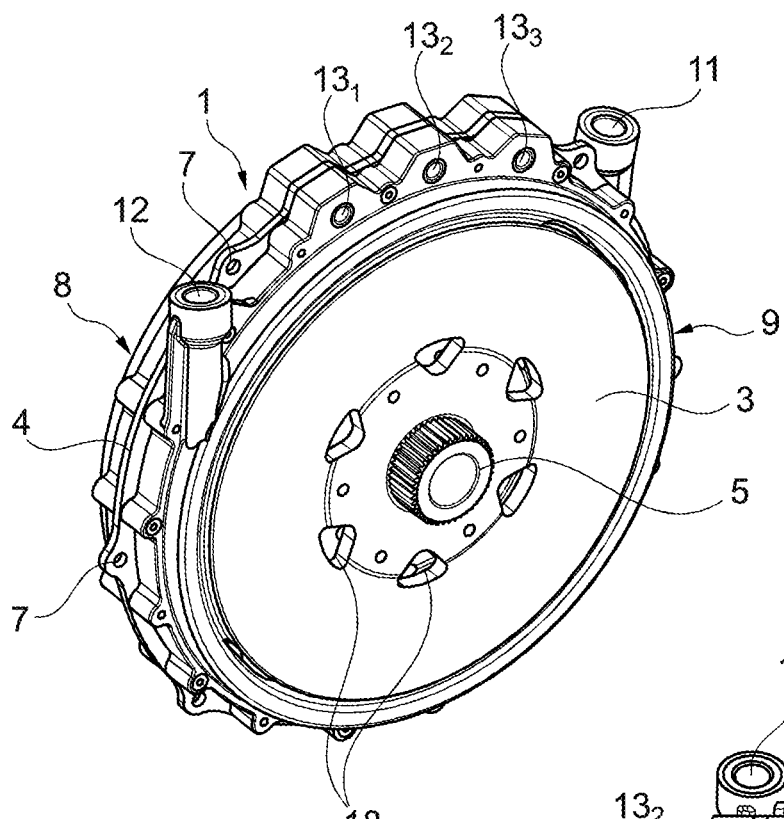
FIG. 1 shows a perspective view of an axial flux machine.

FIG. 1 shows a perspective view of an axial flux machine 1. The axial flux machine 1 comprises a first rotor disk 2 (see FIGS. 2 and 3) and a second rotor disk 3, which are located on a central drive shaft 5 (or transmission input shaft). Between the first rotor disk 2 and the second rotor disk 3 there is a single central support flange 4 for a stator 6 (see FIG. 2). The central support flange 4 has a plurality of connection bores 7 for fastening the axial flux machine 1 (electric motor) to a transmission housing (not shown). A first left stator cover 8 and a second right stator cover 9 are fixed to the central support flange 4. The first, left stator cover 8 has a first connection 11 for cooling medium and the second, right stator cover 9 has a second connection 12 for cooling medium. Furthermore, the axial flux machine 1 has three phase connections $13_1$, $13_2$, and $13_3$ for supplying power. The first rotor disk 2 and the second rotor disk 3 have ventilation openings 18 formed for cooling the iron cores 10 (see, for example, FIG. 2) of the stator 6.

Figure 2:
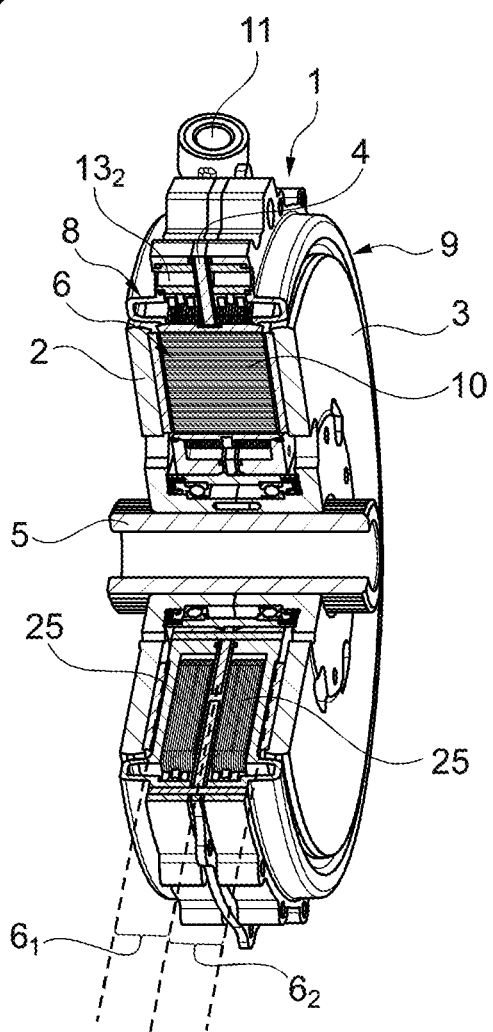
FIG. 2 shows a perspective view of the axial flux machine from FIG. 1 in a partial section.

FIG. 2 shows a perspective view of the axial flux machine 1 from FIG. 1 in a partial section. The partial section is placed to pass through the second phase connection $13_2$, an iron core 10 of the stator 6, the drive shaft 5 and one of the wound coils 25. The wound coils 25 are provided in the first stator half $6_1$ and the second stator half $6_2$. The single central support flange 4 with the retained iron cores 10 for the stator 6 is located between the first rotor disk 2 and the second rotor disk 3. The first connection 11 for coolant or cooling medium can also be seen in this illustration.

Figure 3:
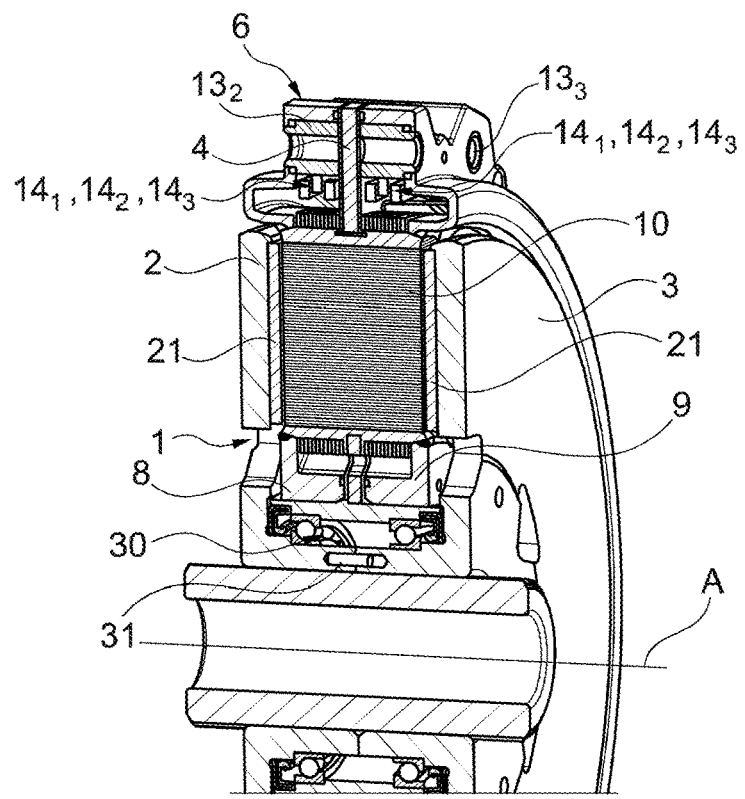
FIG. 3 shows an enlarged perspective view of the axial flux machine from FIG. 1 in a partial section.

FIG. 3 shows an enlarged perspective view of the axial flux machine 1 from FIG. 1 in a partial section. In this illustration, the drive shaft 5 is removed. In this embodiment, the first, left stator cover 8 and the second, right stator cover 9 are located on a bearing sleeve 30. In the event that small bearing forces occur in the axial flux machine 1, the bearing sleeve 30 or hub can be dispensed with as an additional component. The seats required for bearings and shaft sealing rings can then be integrated in the first, left stator cover 8 and the second, right stator cover 9. The first rotor disk 2 and the second rotor disk 3 each carry a plurality of magnets 21 (permanent magnets) which are arranged on both sides in the direction of the axis A opposite the iron cores 10 of the stator 6. The first, left stator cover 8 and second, right stator cover 9 have accommodated the phase connections $13_1$, $13_2$, or $13_3$ and the corresponding number of phase rings $14_1$, $14_2$ or $14_3$, which corresponds to the number of three-phase AC phases of the axial flux machine 1. Although three phase terminals $13_1$, $13_2$, or $13_3$ and three corresponding phase rings $14_1$, $14_2$ or $14_3$ are shown here, this should not be construed as a limitation of the disclosure.

According to one possible embodiment of the disclosure, a first rotor disk 2 and the second rotor disk 3 can be aligned with one another via at least one alignment pin 31. The first rotor disk 2 and the second rotor disk 3 can be rotated relative to the stator 6 via bearings 32.

Figure 4:
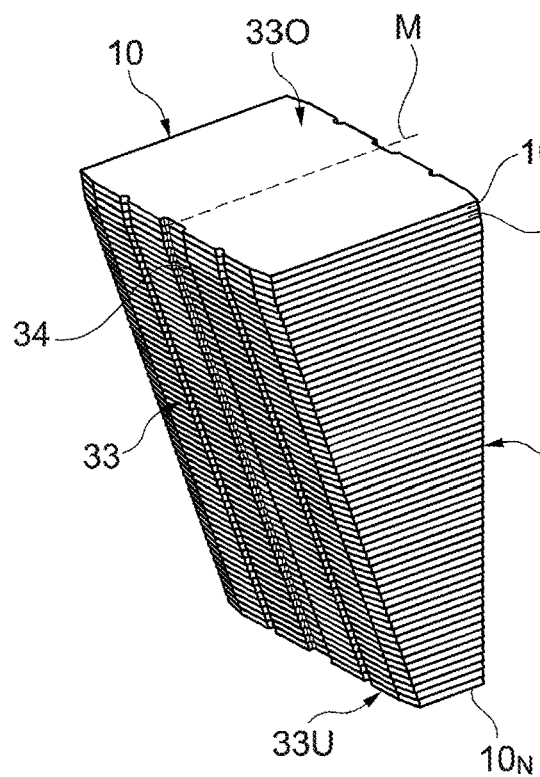
FIG. 4 shows a perspective view of an iron core that is plugged into the axial flux machine according to the disclosure.
Figure 5:
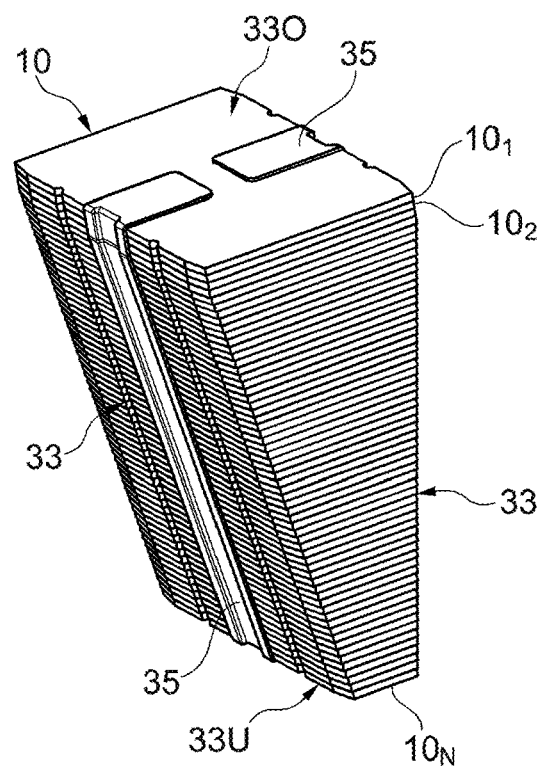
FIG. 5 shows a perspective view of the iron core from FIG. 4, which has an insulator superimposed on a central slot.

FIG. 4 and FIG. 5 show perspective views of an iron core 10 as plugged into the axial flux machine 1 according to the disclosure. It can be seen from the perspective view of FIG. 4 that the iron core 10 has the shape of an annular sector. The iron core 10 itself is made up of several laminations (electrical laminations) $10_1$, $10_2$, . . . , $10_N$. The individual laminations $10_1$, $10_2$, . . . , $10_N$ consist of a baked lacquer coating. In the stacked state, the individual laminations $10_1$, $10_2$, . . . , $10_N$ are baked to form the solid iron core 10 in the form of the annular sector. Each iron core 10 defines two lateral side faces 33, an upper lateral face 33O and a lower lateral face 33U, connecting the two lateral side faces 33 to each other. In the middle, the iron core 10 has a groove 34 on both lateral side faces 33. It can be seen from the illustration in FIG. 5 that the central groove 34 of the iron core 10 has an insulator 35 superimposed thereon. The insulator 35 in the area of the groove 34 can be an abrasion-resistant insulator 35, such as a Kevlar tape that is adhesive on one side.

Figure 6:
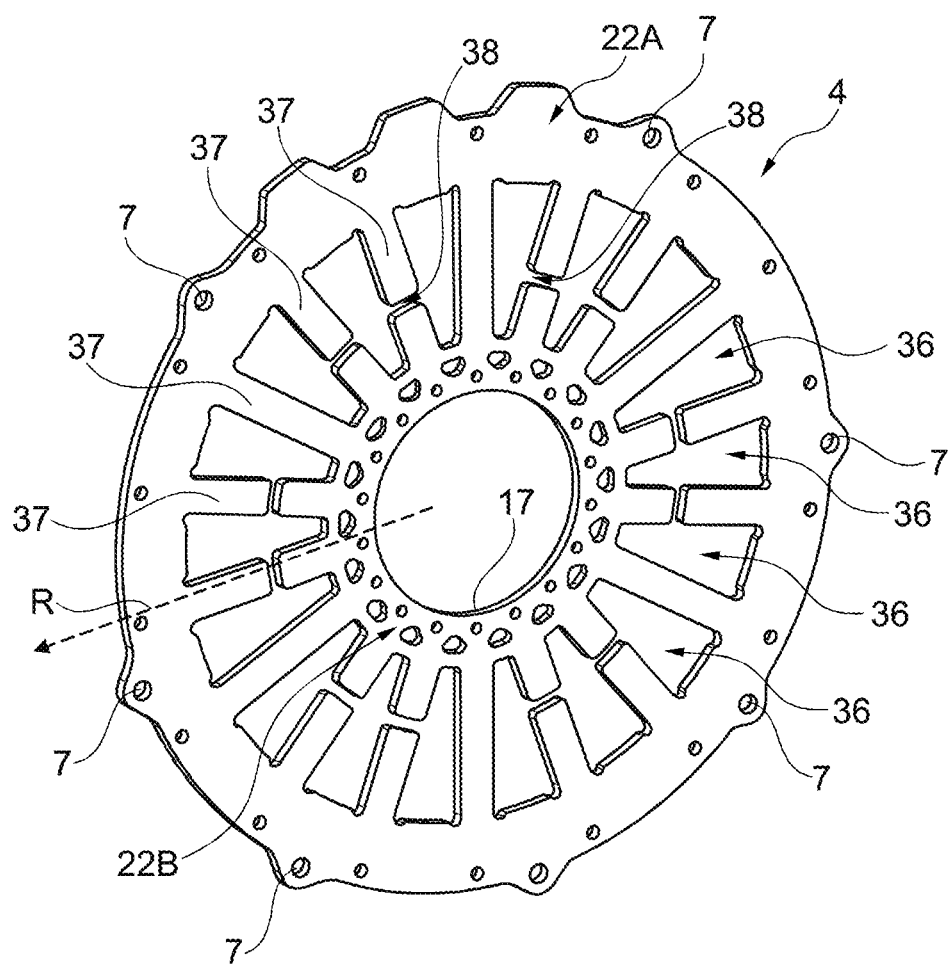
FIG. 6 shows a perspective view of a support flange for a plurality of iron cores.

FIG. 6 shows a perspective view of the single support flange 4 that can be plugged into the stator 6 of the axial flux machine 1. The support flange 4 serves to retain the plurality of iron cores 10. For this purpose, the support flange 4 has a plurality of identical window cutouts 36. The iron cores 10 (see FIGS. 7 to 15) are mounted or retained in the window cutouts 36 of the one-part support flange 4 and are thus arranged uniformly around a central aperture 17 of the support flange 4. The central opening 17 serves to receive the support flange 4 on a hub 50 (see FIG. 19).

The window cutouts 36 are separated from one another by webs 37. The webs 37 run in the radial direction R from an outer ring 22A to an inner ring 22B. Some of the webs 37 are separated from one another by an air gap 38. Without the air gaps 38, the webs 37 would form closed rings which comprise the iron cores 10. This would then correspond to a coil with exactly one turn, which would comprise each of the iron cores 10. Due to the alternating magnetic field, such a high current would be induced in these rings in the respective iron cores 10 as to lead to strong heating and high efficiency losses. Such an effect is avoided by the air gaps 38 in the webs 37.

The exemplary embodiment described here is a 3-phase alternating current motor (axial flux machine 1). Since the sum of the inductions of the three phases is zero again, every third web 37 can be designed without an air gap 38. In order to additionally prevent the formation of eddy currents in the support flange 4, this is preferably produced from a weakly magnetic to non-magnetic material which at the same time has a high specific electrical resistance. Chromium-nickel steels, such as V2A or V4A steel, have these corresponding properties. The support flange 4 has the plurality of connection holes 7 for attaching the axial flux machine 1 (electric motor) to a transmission housing (not shown) formed on the outer ring 22A.

In the illustrations of FIGS. 7 to 14, the assembly of the individual iron cores 10 in the respective window cutouts 36 of the support flange 4 is shown. The window cutouts 36 are designed in such a way that the webs 37 engage in the two central grooves 34 of the respective iron core 10 in a form-fitting manner. In order that the iron cores 10 can be pushed into the window cutouts 36 with sufficient joint play, the window cutouts 36 are slightly lengthened or enlarged outwards in the radial direction R.

Figure 7:
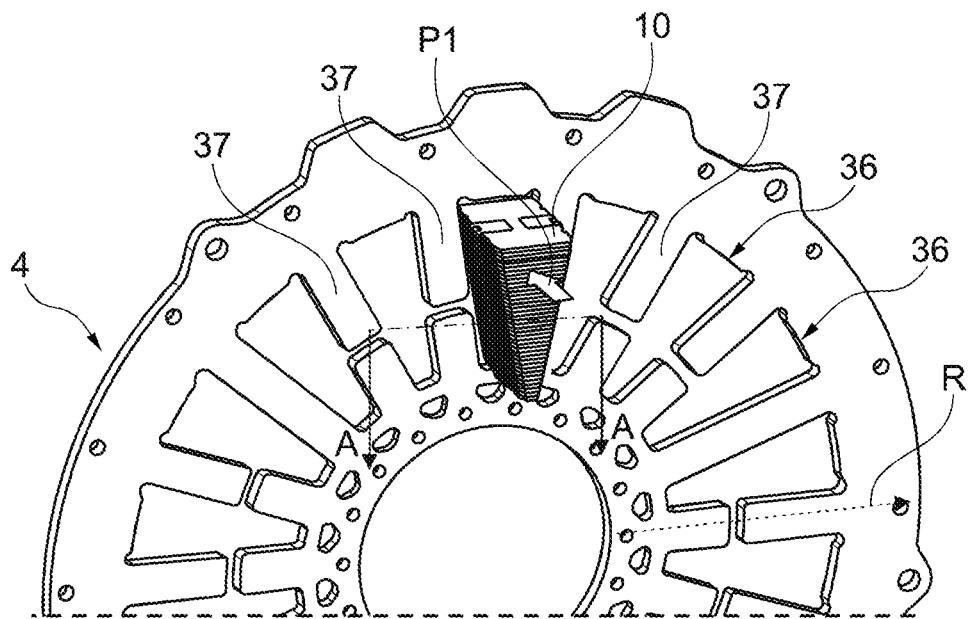
FIG. 7 shows a perspective view of a support flange with the iron core from FIG. 5 in the insertion position.
Figure 8:
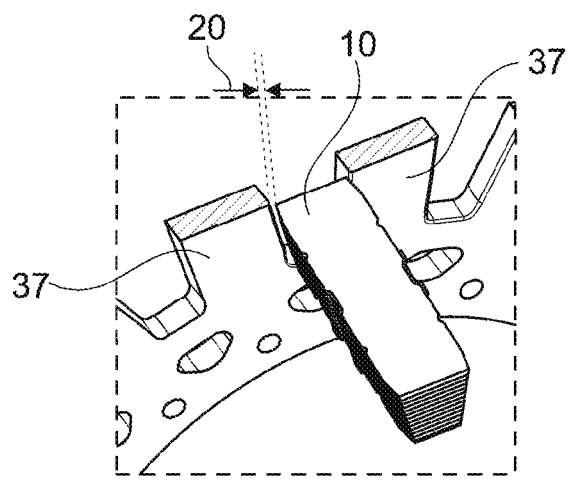
FIG. 8 shows an enlarged perspective sectional view along the line A-A shown in FIG. 7.

FIG. 7 shows a perspective view of the support flange 4 with the iron core 10 from FIG. 5 in the insertion position of one of the window cutouts 36. The illustration shown in FIG. 8 is an enlarged perspective sectional view taken along the line A-A shown in FIG. 7. The iron core 10 has a clearance 20 at least in relation to the webs 37, so that it can be easily inserted into the window cutouts 36 without being damaged. The iron core 10 is inserted into the window cutouts 36 in the direction of arrow P1.

Figure 9:
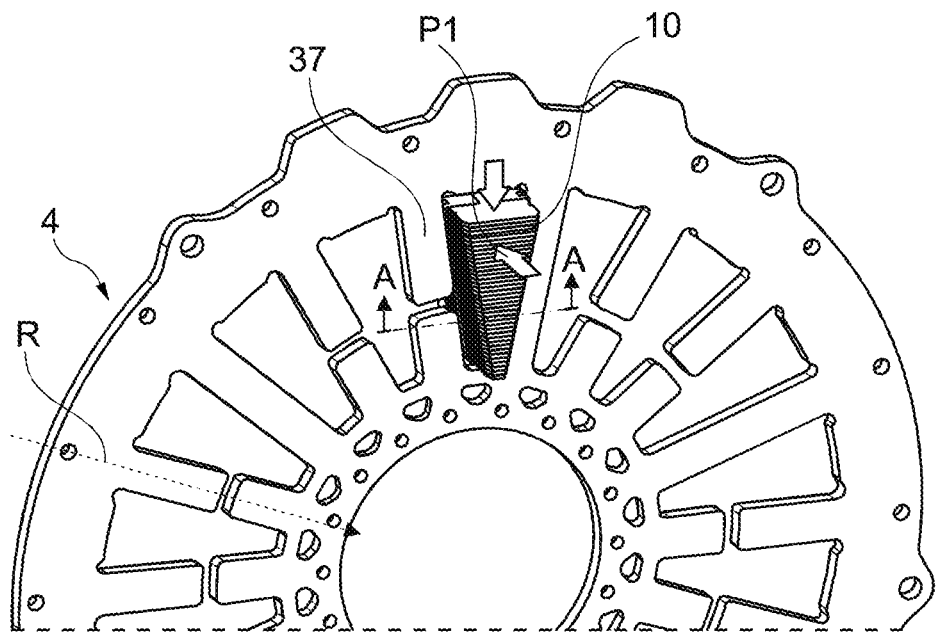
FIG. 9 shows a perspective view of the support flange with the iron core in the fully inserted position in the support flange.
Figure 10:
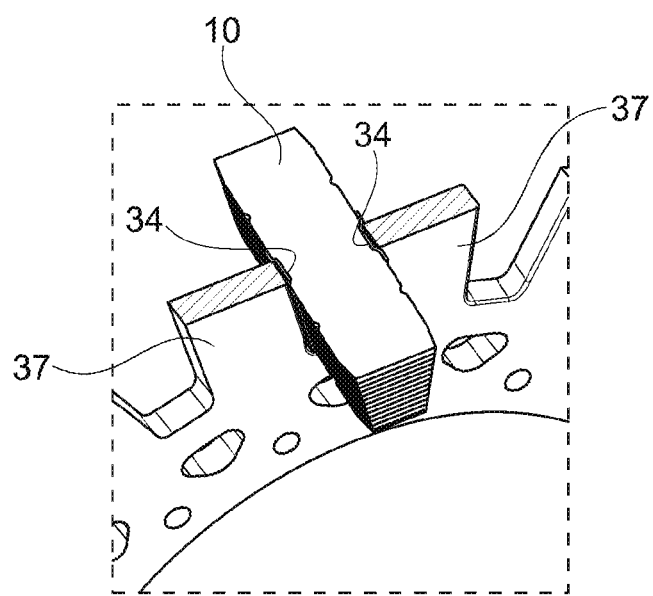
FIG. 10 shows an enlarged perspective sectional view along the line A-A shown in FIG. 9.

FIG. 9 shows a perspective view of the support flange 4 with the iron core 10 in the fully inserted position in the support flange 4. The iron core 10 has arrived at the position in which the webs 37 are aligned with the groove 34. In this position, the iron cores 10 are pushed inwards in the radial direction R. FIG. 10 shows an enlarged perspective sectional view along the line A-A shown in FIG. 9. The groove 34 is aligned with the webs 37 and the clearance 20 (see FIG. 8) between the iron core 10 and the webs 37 is reduced.

Figure 11:
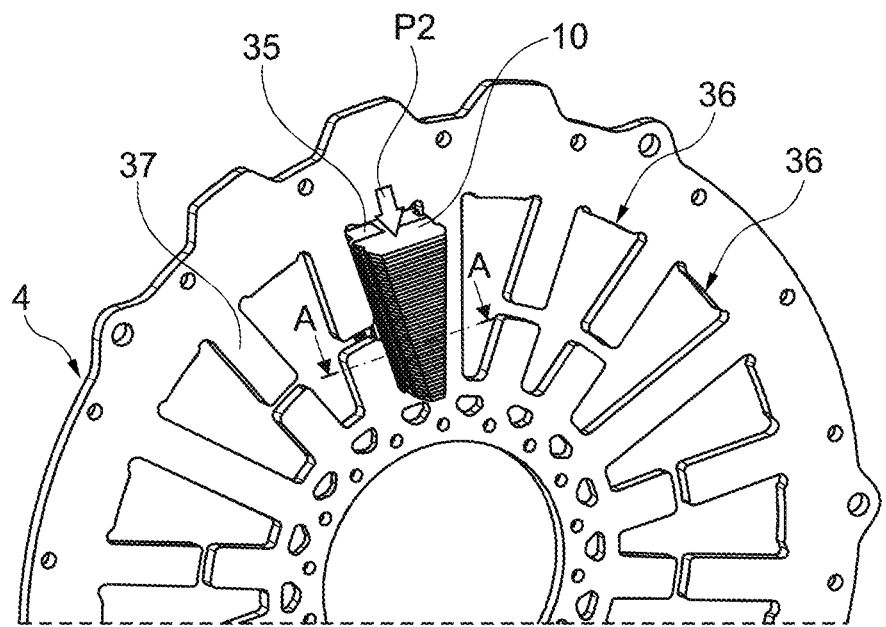
FIG. 11 shows a perspective view of the support flange with the iron core in the working position.
Figure 12:
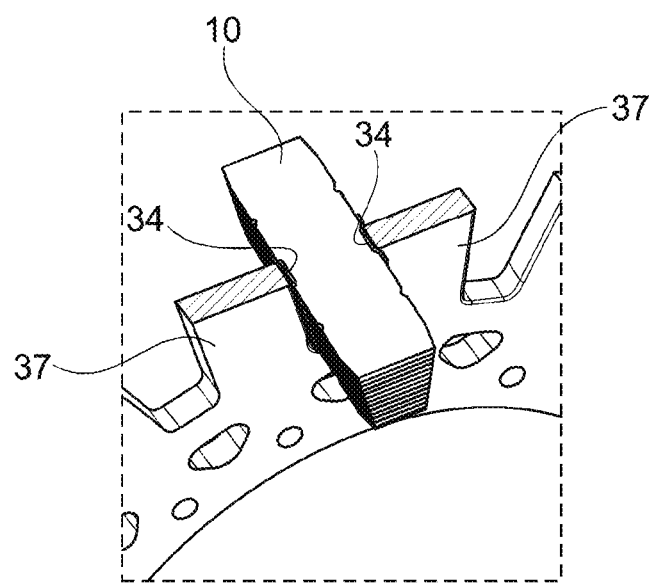
FIG. 12 shows an enlarged perspective sectional view along the line A-A shown in FIG. 11.

FIG. 11 shows a perspective view of the support flange 4 with the iron core 10 in the working position. The iron core 10 is pushed toward the center of the support flange 4 in the direction of arrow P2. The illustration shown in FIG. 12 is an enlarged perspective sectional view taken along the line A-A shown in FIG. 11. It can be clearly seen here that, due to the wedge-shaped geometry of the window cutouts 36, the webs 37 rest against the deepened groove 34 of the iron core 10. The insulator 35 (insulating tape) in the groove 34 prevents the webs 37 from coming into direct contact with the laminations $10_1, 10_2, \ldots, 10_N$ of the iron core 10. This ensures that the individual laminations $10_1, 10_2, \ldots, 10_N$ of the iron core 10 cannot be short-circuited with one another.

Figure 13:
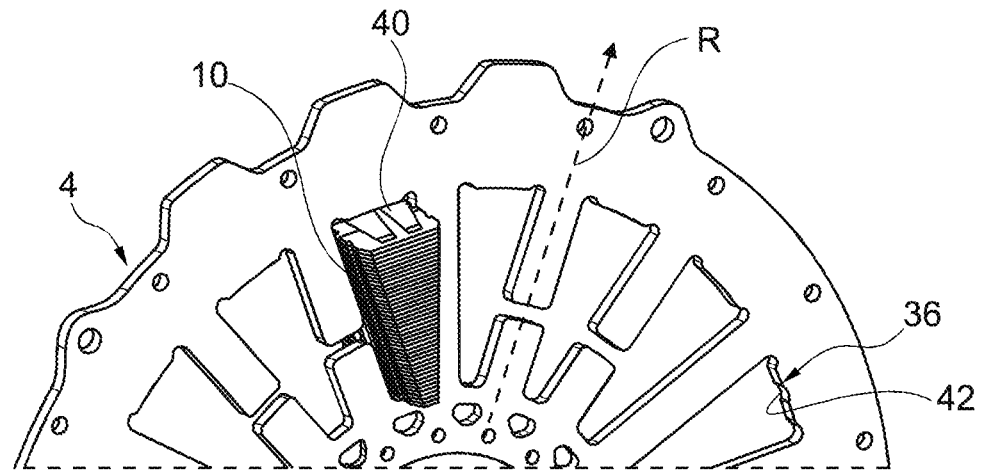
FIG. 13 shows a perspective view of the support flange, in which the iron core is secured in the working position with a securing element.
Figure 14:
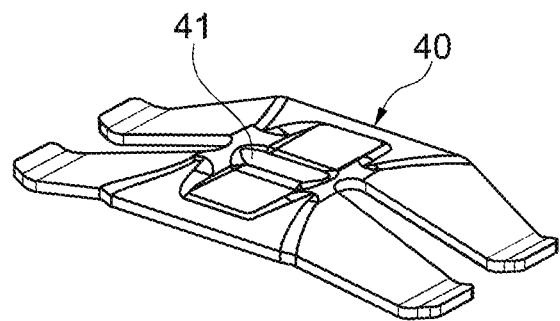
FIG. 14 shows a perspective view of the securing element.

FIG. 13 shows a perspective view of the support flange 4, in which the iron core 10 is secured with a securing element 40 in the working position in the support flange 4. FIG. 14 shows a perspective and enlarged view of the securing element 40. The securing element 40 can be realized, for example, by a leaf spring, which is pushed in after the positioning of the iron core 10 and fixes the iron core 10 in the radial direction R under a pre-loading force. In the embodiment shown here, the securing element 40 is H-shaped. The securing element 40 has a positioning element 41 which interacts in a form-fitting manner with a corresponding counterpart 42 on the annular segment-shaped window cutout 36 of the support flange 4.

Figure 15:
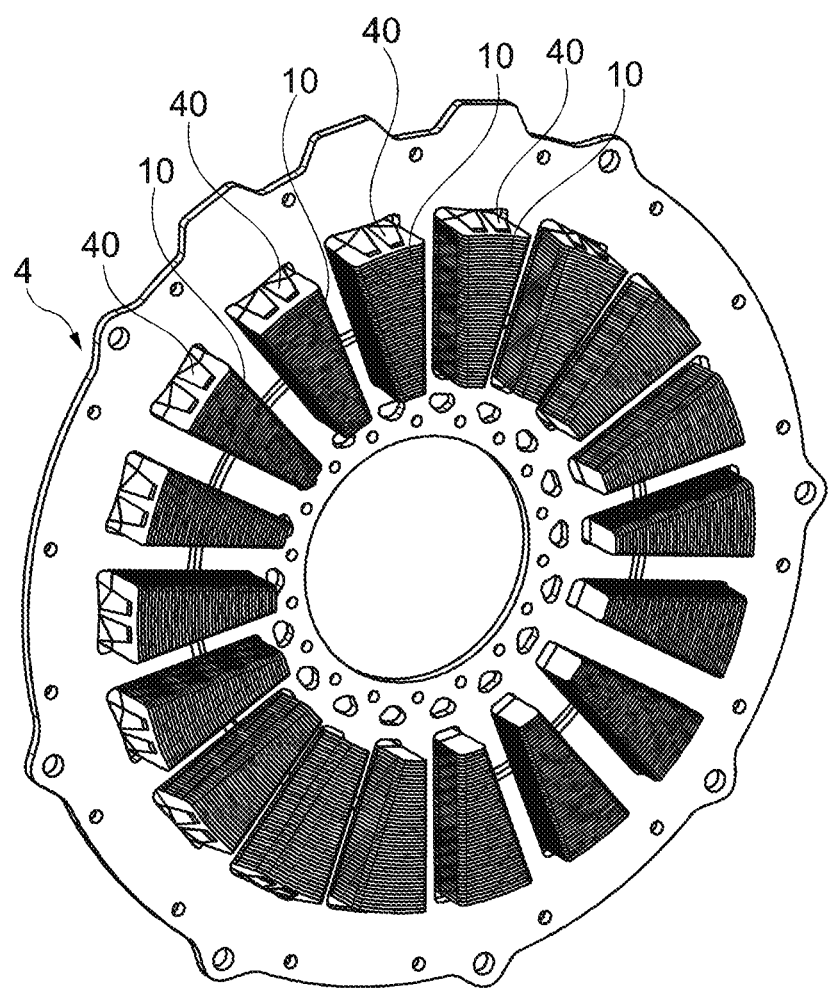
FIG. 15 shows a perspective partial view of the support flange with the plurality of mounted iron cores.

FIG. 15 shows a perspective partial view of the support flange 4 with the plurality of mounted iron cores 10. Each of the iron cores 10 is secured in the support flange 4 by a securing element 40.

Figure 16:
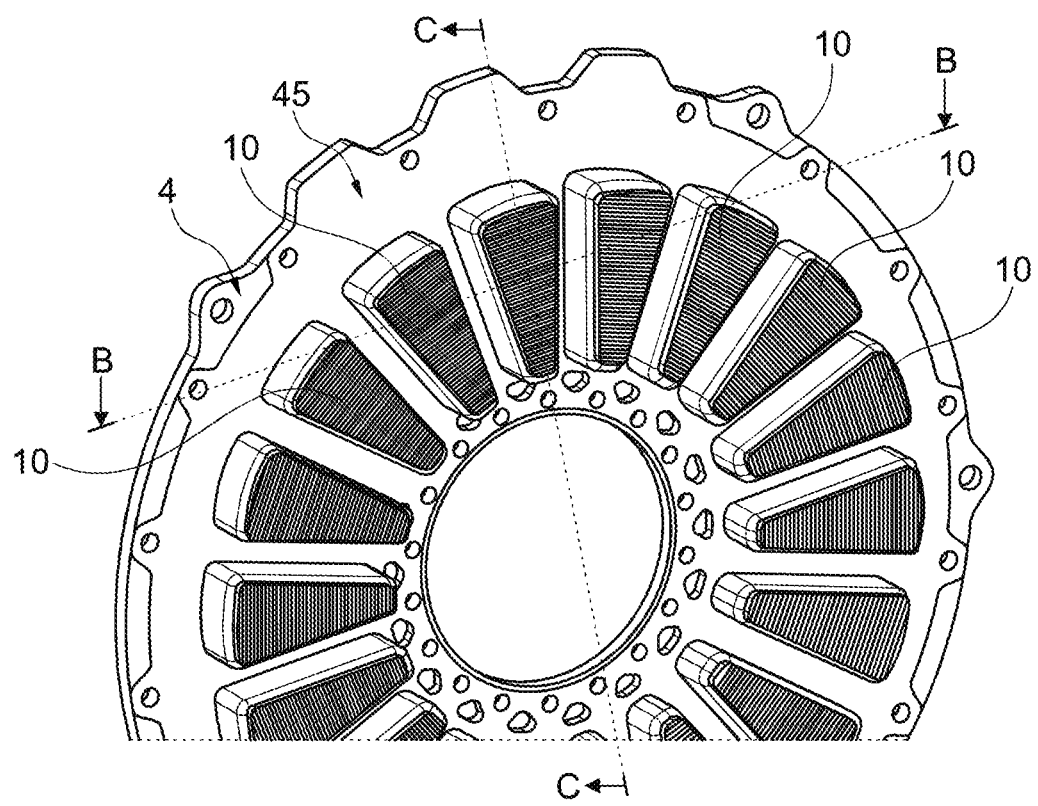
FIG. 16 shows a perspective partial view of the support flange with the plurality of mounted iron cores, which are overmolded with a plastic.
Figure 17:
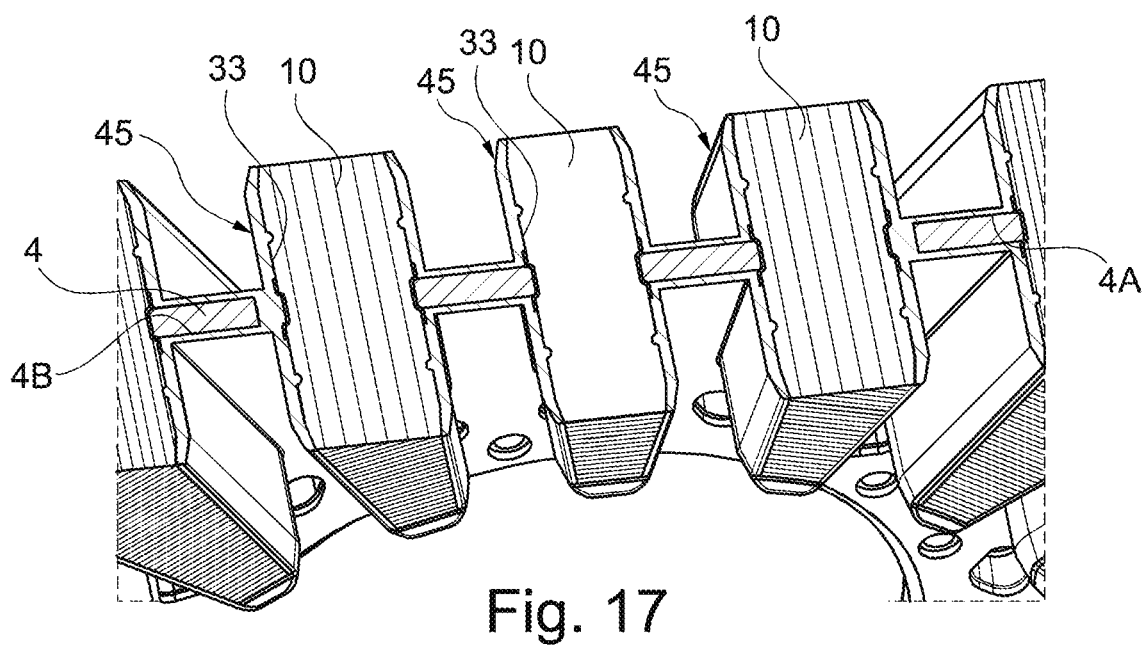
FIG. 17 shows an enlarged perspective sectional view along the section line B-B shown in FIG. 16.
Figure 18:
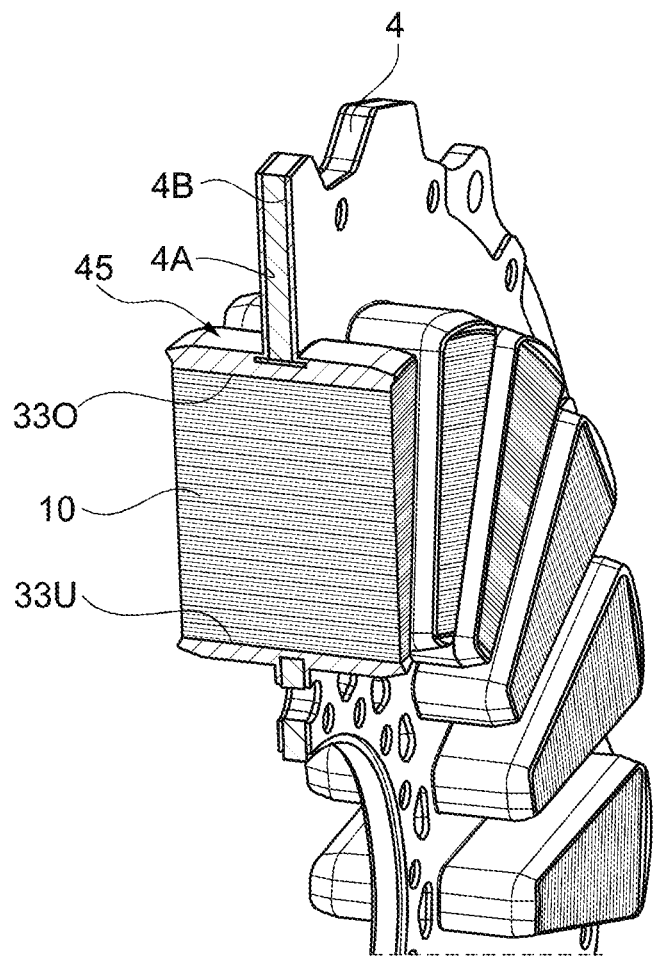
FIG. 18 shows an enlarged perspective sectional view along the section line C-C shown in FIG. 16.

FIG. 16 shows a partial perspective view of the support flange 4 with the mounted iron cores 10, which are at least partially overmolded with a plastic 45. The overmolding of the iron cores 10 results in 100% tightness, which is necessary for the cooling concept. All iron cores 10 and their securing elements 40 are finally "frozen" in their position in the support flange 4 by the overmolding. FIG. 17 shows an enlarged sectional view along section line B-B shown in FIG. 16. FIG. 18 shows an enlarged sectional view taken along the section line C-C shown in FIG. 16. It can be seen from FIGS. 17 and 18 that the overmolded plastic 45 rests on the iron cores 10 on the lateral faces 33 of the iron cores 10 and on the upper lateral faces 33O and the lower lateral faces 33U. The overmolded plastic 45 also rests on the two sides 4A and 4B of the support flange 4.

Figure 19:
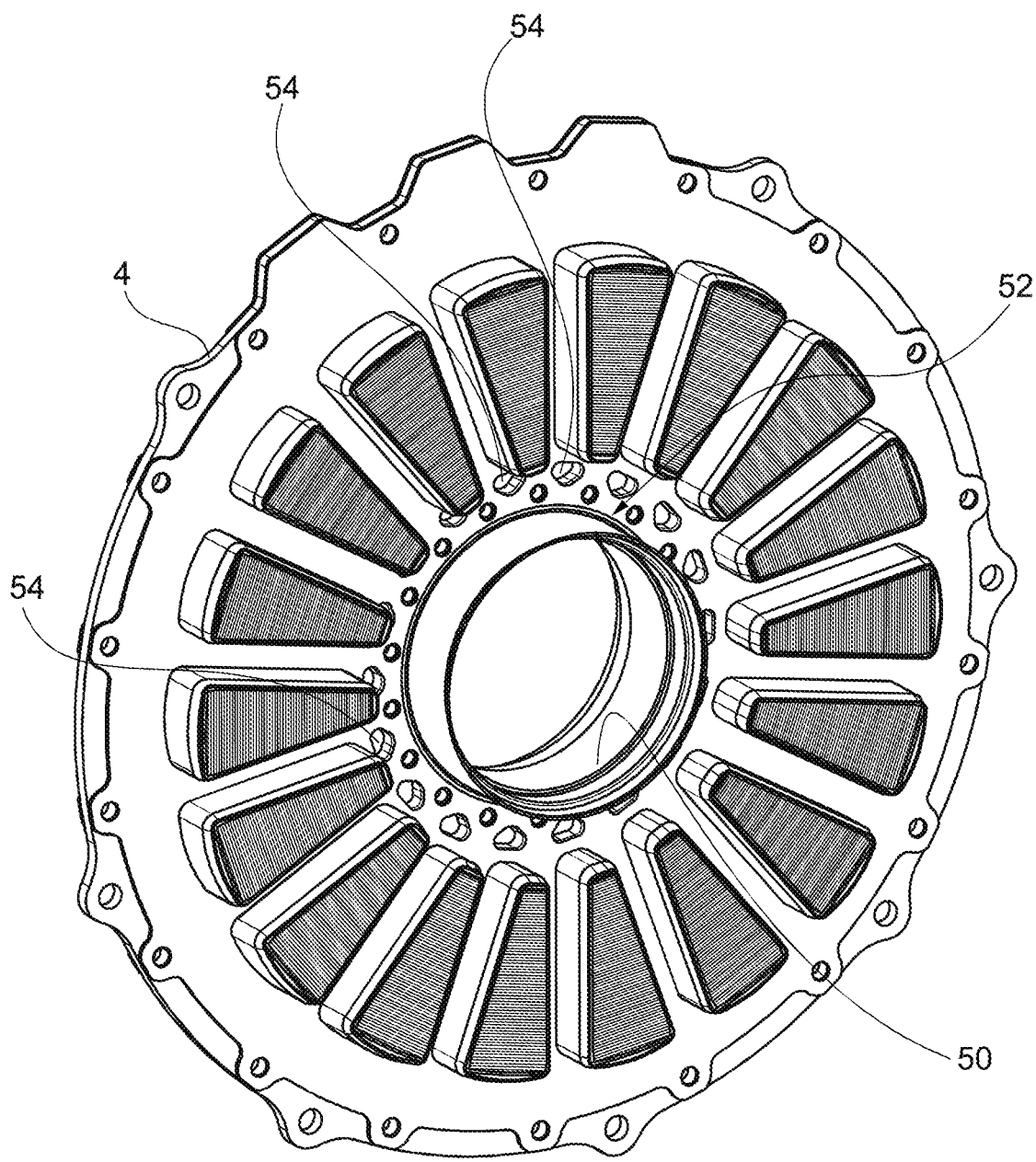
FIG. 19 shows a partial perspective view of the overmolded support flange on a hub.

FIG. 19 shows a partial perspective view of the overmolded support flange 4 on a hub 50. The hub 50 or the bearing sleeve 30 (see FIG. 3) can be mounted on the support flange 4 with a laser seam 52, for example. The overmolded support flange 4 has flow openings 54 for the cooling medium.

Figure 20:
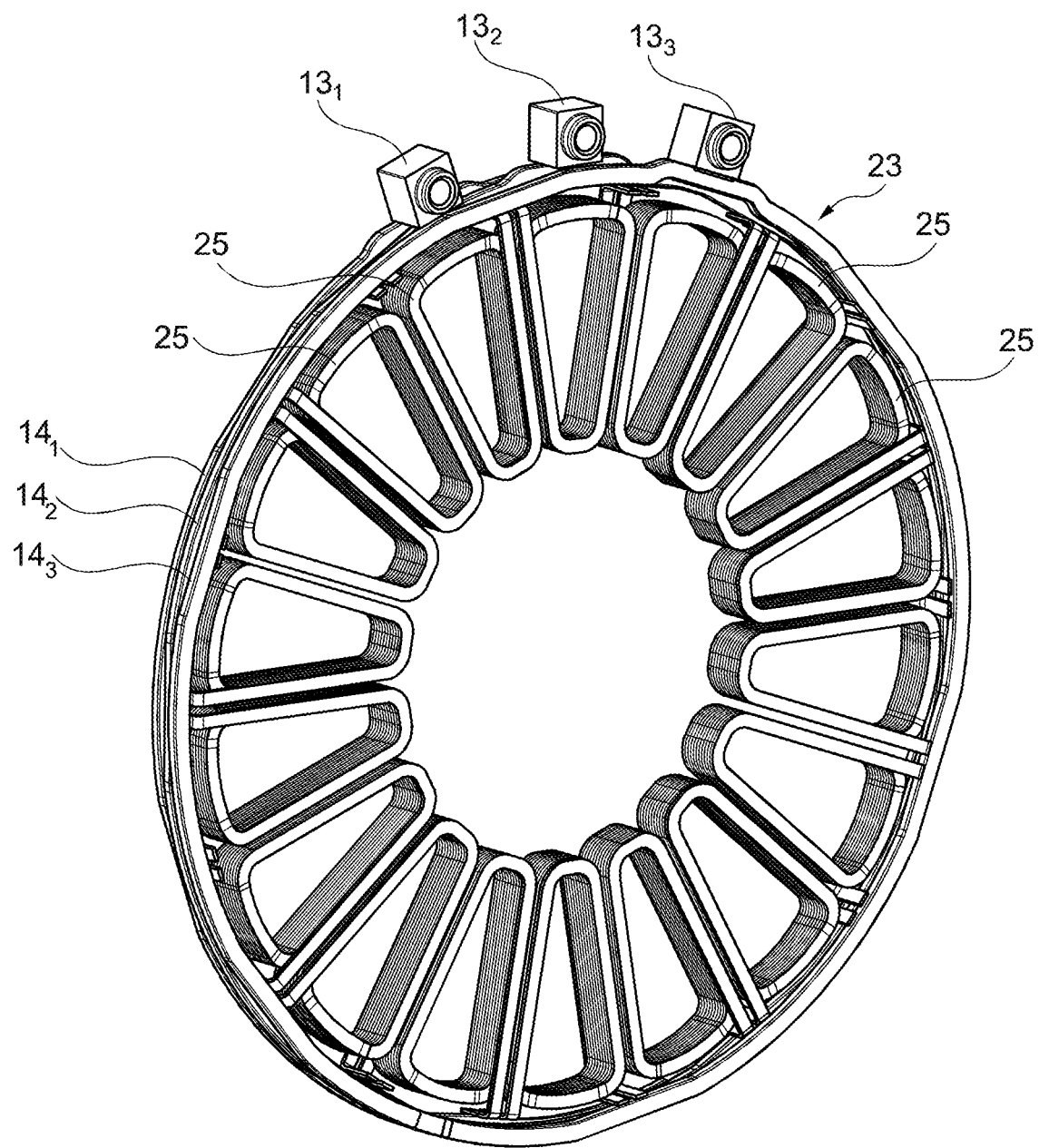
FIG. 20 shows a perspective partial view of the preassembled coils, which are pushed onto the component from FIG. 19.
Figure 21:
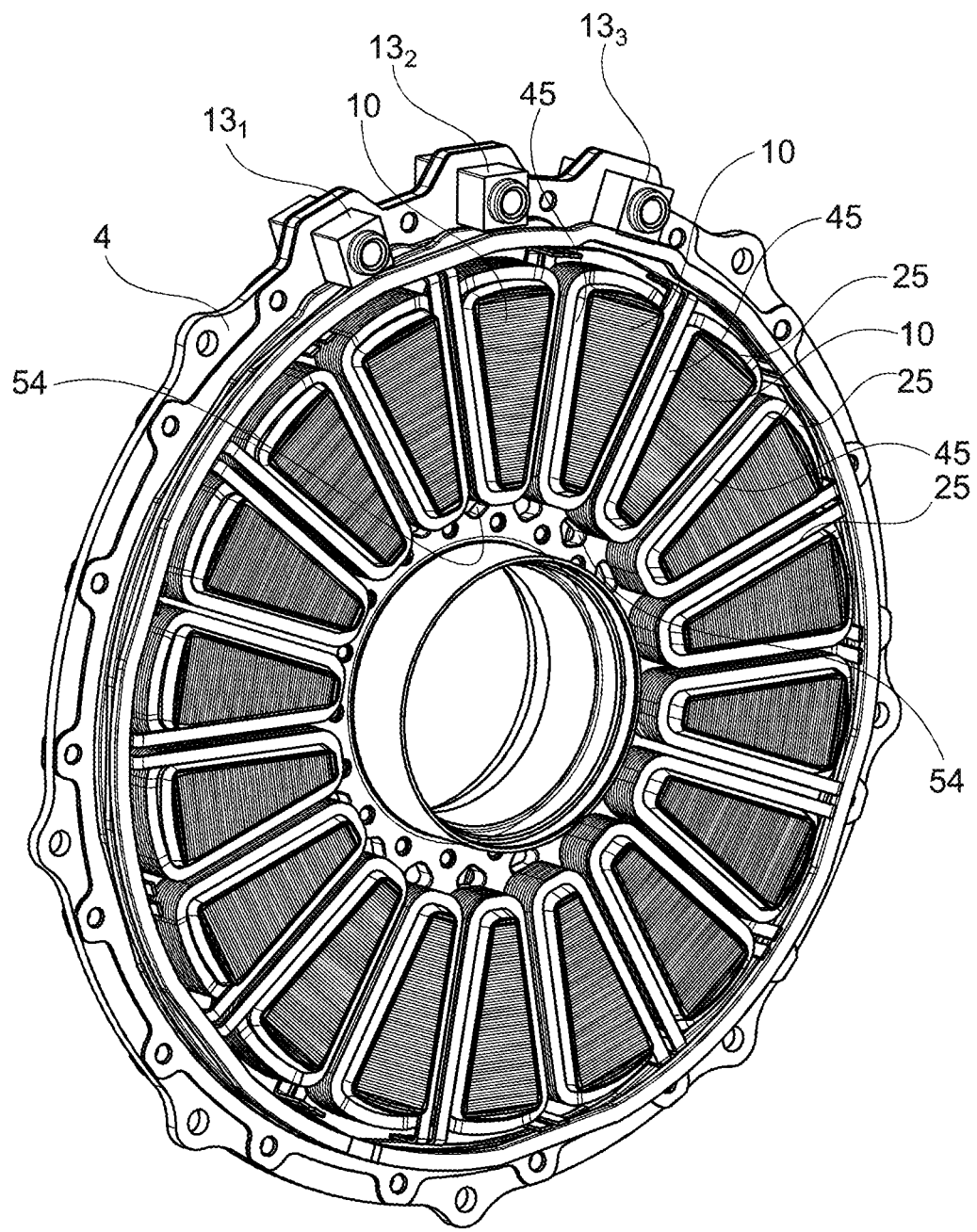
FIG. 21 shows a perspective partial view of the coils mounted on the component.

FIG. 20 shows a partial perspective view of a coil unit 23 of the preassembled coils 25, which are pushed onto the component (overmolded support flange 4 with iron cores 10) from FIG. 19. The preassembled coils 25 also have three phase connections $13_1$, $13_2$ and $13_3$ and the three associated phase rings $14_1$, $14_2$ and $14_3$. The coils 25 can preferably be made of edgewise wound flat wire. As can be seen from FIG. 21, each of the coils 25 surrounds an iron core 10 and rests on the plastic 45. The wound coils 25 are shaped in such a way that they embrace the shape of the annular sector of the iron cores 10. The preassembled coils 25 are attached to both sides of the support flange 4 with the iron cores 10. The coils 25 mounted on the component (overmolded support flange 4 with iron cores 10) leave the flow openings 54 for the coolant in the support flange 4 exposed.

Figure 22:
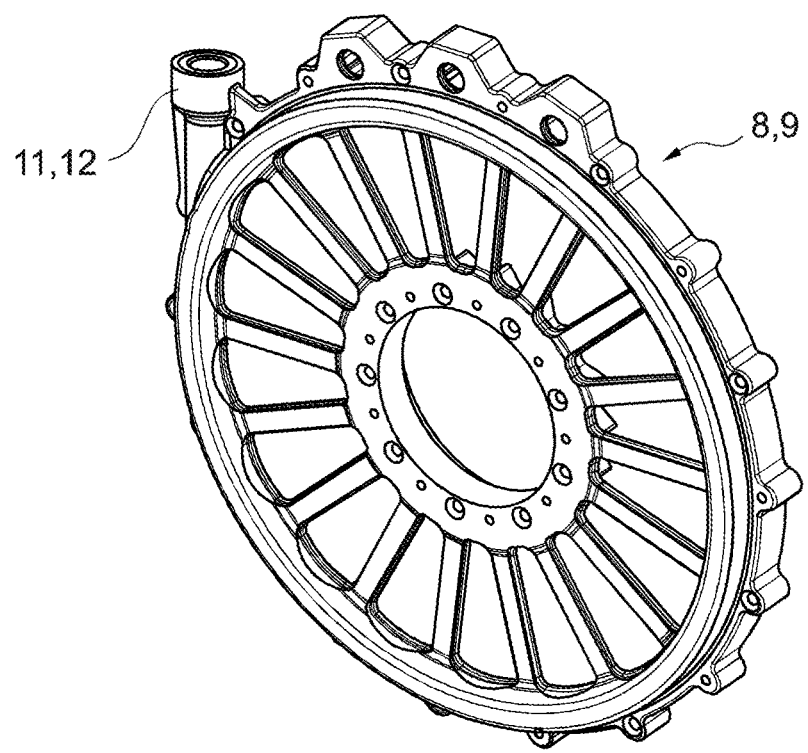
FIG. 22 shows a perspective external view of the stator cover.
Figure 23:
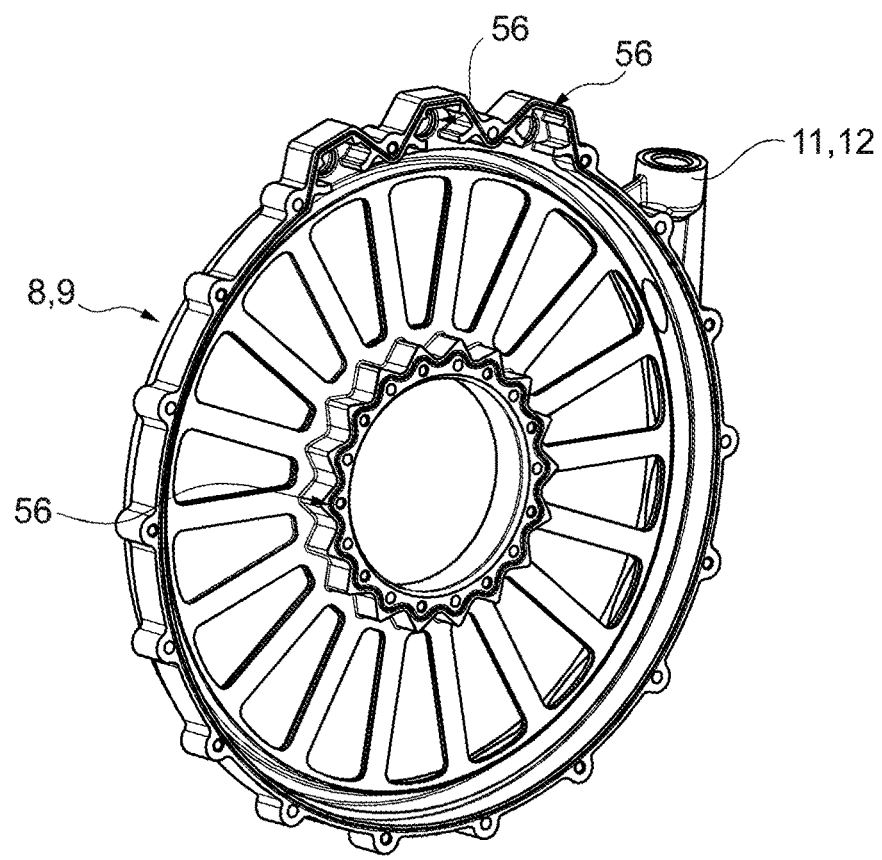
FIG. 23 shows a perspective internal view of the stator cover.
Figure 24:
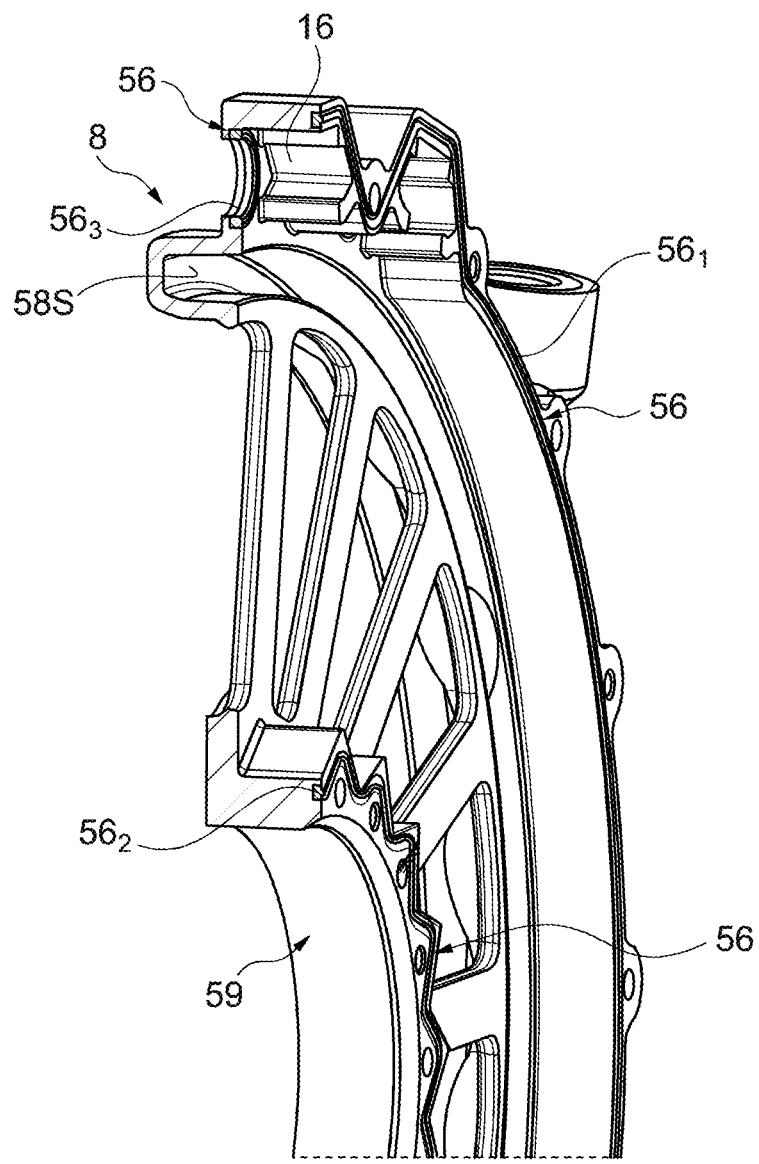
FIG. 24 shows a perspective partial view of the stator cover in a partial section.

FIG. 22 and FIG. 23 show different perspective views of the first, left stator cover 8 and the second, right stator cover 9 respectively. FIG. 22 shows a perspective external view of the first, left stator cover 8 or the second, right stator cover 9 and FIG. 23 shows a perspective internal view of one of the two stator covers 8 or 9. Each of the stator covers 8 or 9 is made of plastic, for example preferably in the 2K injection molding process. Thus, sealing geometries 56 in the form of elastomer areas can already be integrated in the 2K injection molding process. The sealing geometries 56 can be complex. Likewise, the first connection 11 or the second connection 12 for the cooling medium is also formed during the injection molding process of the stator covers 8 or 9. FIG. 24 shows a partial perspective view of the stator cover 8 in a partial section. The first stator cover 8 has a collection channel 58S for the return of the coolant or cooling medium. The second stator cover 9 (not shown here) has a distribution channel 58V for the inflow of the coolant or cooling medium (see FIG. 26). The sealing geometries 56 are arranged on the side of the stator cover 8 or 9 facing the stator 6. At least one first circumferential elastomer seal $56_1$ runs in the area of the outer circumference of the stator cover 8 or 9. A second circumferential elastomer seal $56_2$ is arranged around an opening 59 for the hub 50 (see FIG. 19). A further elastomer seal $56_3$ is formed in the stator cover 8 or 9 in each receptacle 16 in such a way that it rests around the respective phase connection $13_1$, $13_2$ and $13_3$ when the stator covers 8 and 9 are mounted.

Figure 25:
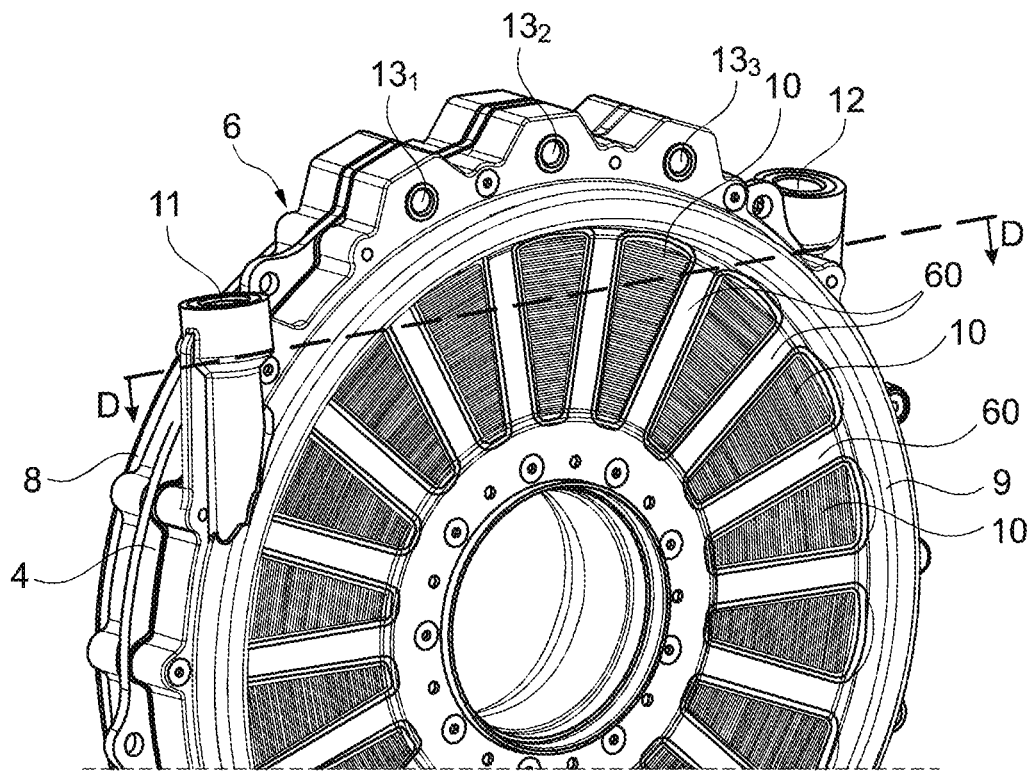
FIG. 25 shows a perspective partial view of the stator assembly with the stator cover.

FIG. 25 shows a perspective partial view of the structure of the stator 6 with the mounted first, left stator cover 8 and the second, right stator cover 9. The two stator covers 8 and 9 are pushed onto both sides of the central support flange 4 in such a way that the two stator covers 8 and 9, which rest against the central support flange 4, enclose the phase connections $13_1$, $13_2$ and $13_3$. The spokes 60 of each stator cover 8 and 9 come to rest between the individual iron cores 10 of the stator 6. The first, left stator cover 8 has the first connection 11 for cooling medium (such as a return line for cooling medium). The second, right stator cover 9 has the second connection 12 for cooling medium (such as an inlet line for cooling medium). The first, left stator cover 8 and the second, right stator cover 9 are screwed together with a plurality of screw connections 62 and are thus securely held on the stator 6. This also supports the sealing effect of the first circumferential elastomer seal $56_1$, the second circumferential elastomer seal $56_2$ and the further elastomer seal $56_3$ of the first, left stator cover 8 and the second, right stator cover 9.

Figure 26:
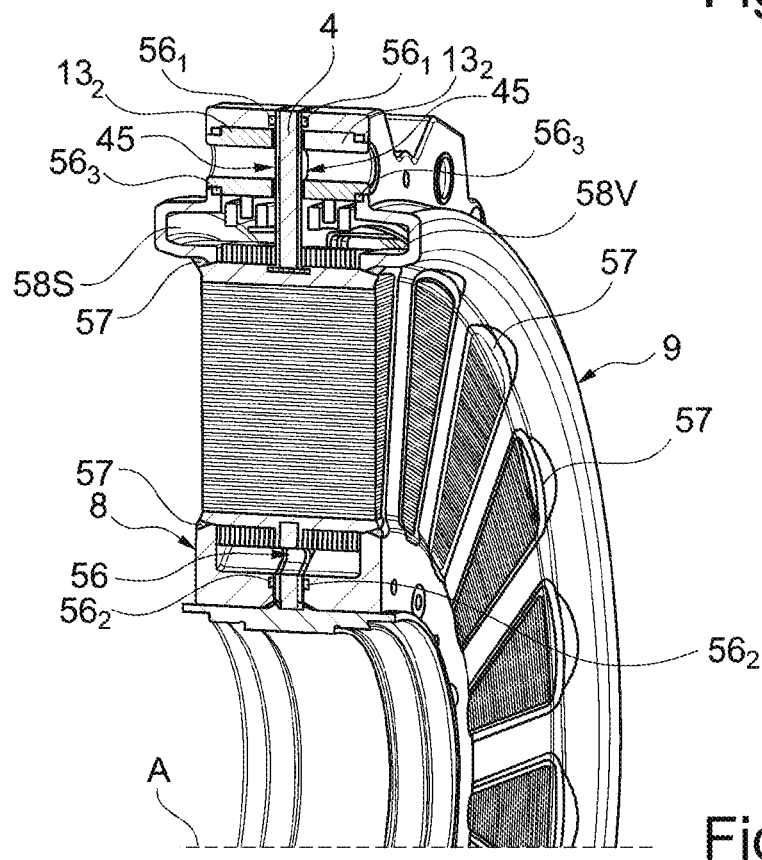
FIG. 26 shows a partial perspective view of a section along the axis of the assembly of FIG. 25.

FIG. 26 shows a perspective partial view of a section along the axis A of the structure from FIG. 25, from which the sealing effect of the first circumferential elastomer seal $56_1$, the second circumferential elastomer seal $56_2$ and the further elastomer seals $56_3$ of the first, left stator cover 8 and of the second, right stator cover 9 can be seen. The first circumferential elastomer seal $56_1$ and the second circumferential elastomer seal $56_2$ rest circumferentially against the plastic 45 with which the support flange 4 is overmolded. The second circumferential elastomer seal $56_2$ seals the flow openings 54 in the support flange 4. The further elastomer seals $56_3$ enclose the phase connections $13_1$, $13_2$ and $13_3$. To seal the two stator covers 8 and 9 on the areas of the iron cores 10 that are overmolded with the plastic 45, peripheral grooves/notches can be formed, into which a sealant 57 (such as sealing adhesive) is subsequently introduced. The collection channel 58S of the first left stator cover 8 functions as a collection channel for the return flow of the cooling medium. The distribution channel 58V of the second, right stator cover 9 functions as a distribution channel for an inflow of the cooling medium.

Figure 27:
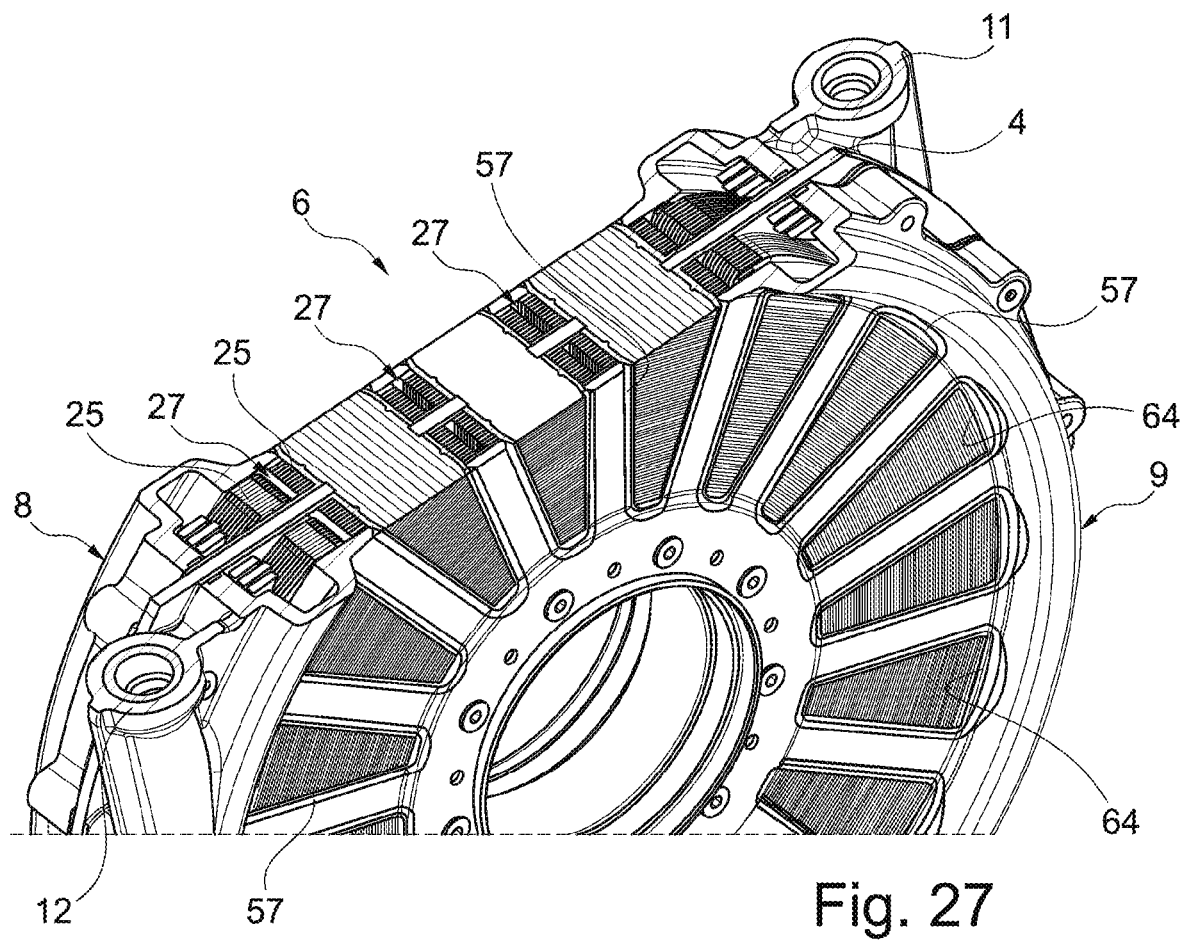
FIG. 27 shows an enlarged sectional view along the section line D-D shown in FIG. 25.
Figure 28:
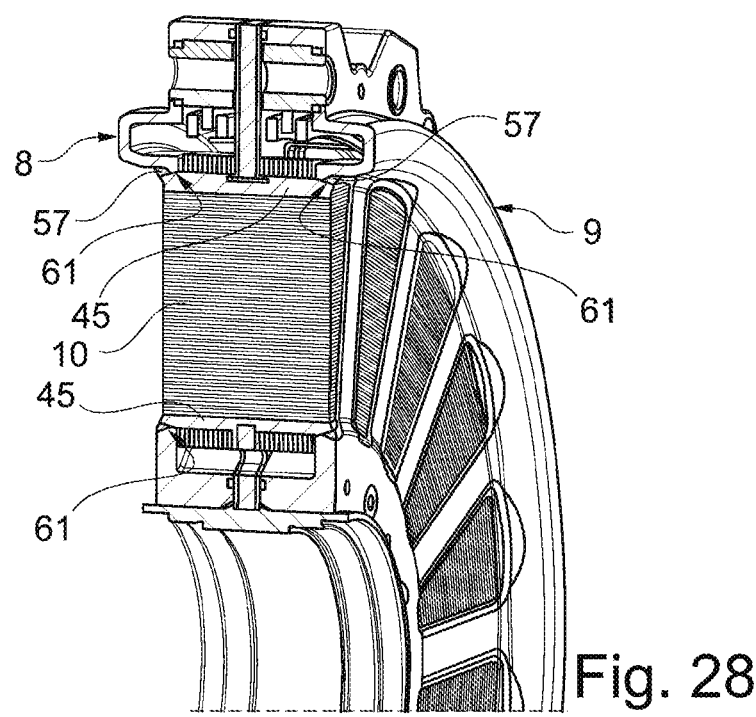
FIG. 28 shows a partial perspective view of a section along the axis of the assembly of FIG. 25.

FIG. 27 shows an enlarged sectional view taken along the line D-D shown in FIG. 25. FIG. 28 shows a partial perspective view of a section along the axis A of the structure analogous to FIG. 26. The two sectional views of FIGS. 27 and 28 show the application of a sealant 57 for sealing the first, left stator cover 8 and the second, right stator cover 9. The sealant 57 is provided around cutouts 64 of the first, left stator cover 8 and the second, right stator cover 9. As can be seen from FIG. 27, gaps 27 between the coils 25 serve as cooling channels. According to a possible embodiment of the present disclosure, the sealant 57 can be designed as a sealing adhesive. A negative pressure can be applied to the interior space of the stator 6 defined by the first, left stator cover 8 and the second, right stator cover 9 via the first connection 11 for the cooling medium and the second connection 12. In this way, the sealant 57 in the form of a sealing adhesive is "suctioned" into the roots of the circumferential grooves/notches 61 (adhesive grooves), as a result of which the best possible wetting of the gaps 27 is achieved. Likewise, the sealant 57 (such as sealing adhesive) is introduced into the grooves/notches 61 of the spokes 60 of the two stator covers 8 and 9 and in the areas of the iron cores 10 that are overmolded with the plastic 45. According to a possible further embodiment, it is conceivable that the sealant 57 is designed in the form of an elastomer seal. This would then also already be realized during the manufacture of the stator covers 8 and 9 by injection molding—however, not on the outside of the stator covers 8 and 9, as shown in FIG. 27, but on the side of the stator covers 8 and 9 facing the interior of the stator 6.

Figure 29:
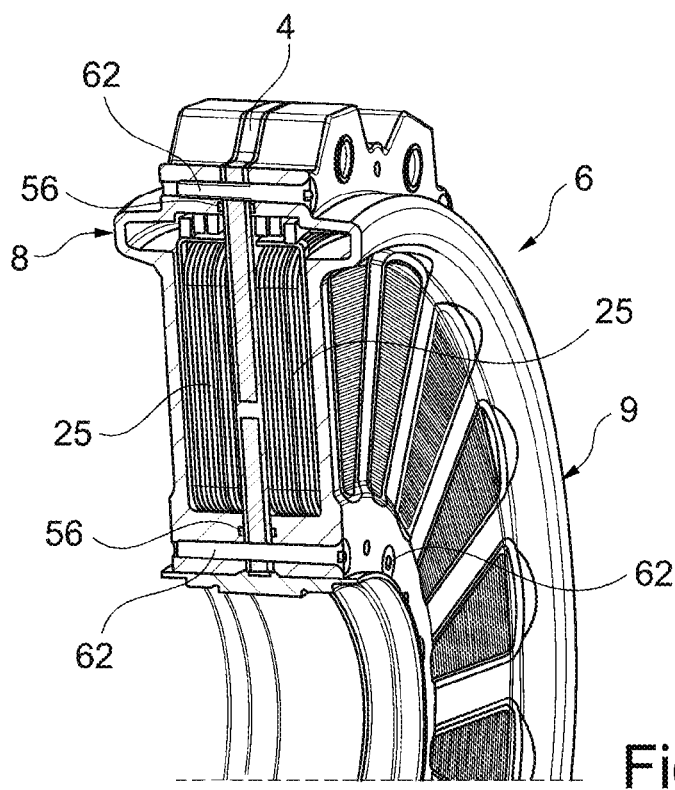
FIG. 29 shows a perspective partial view of a section through the stator assembly along a bobbin.
Figure 30:
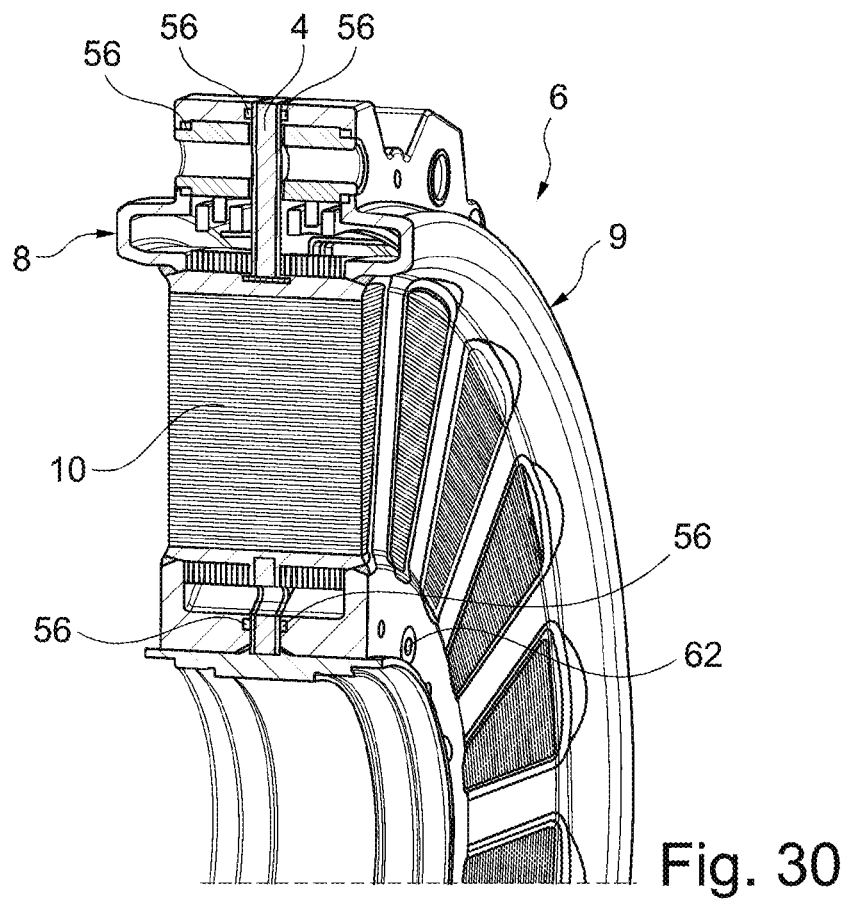
FIG. 30 shows a perspective partial view of a section through the stator assembly along an iron core.

FIG. 29 shows a perspective partial view of a section through the structure of the stator 6 along a coil 25 of the stator 6. FIG. 30 shows a partial perspective view of a section through the structure of the stator 6 along an iron core 10. Due to multiple screw connections 62 between the first stator cover 8 and the second stator cover 9 as well as the connections by means of sealing geometries 56, the stator 6 becomes a solid and resilient structure. The stator 6 can thus absorb all bearing forces.

Figure 31:
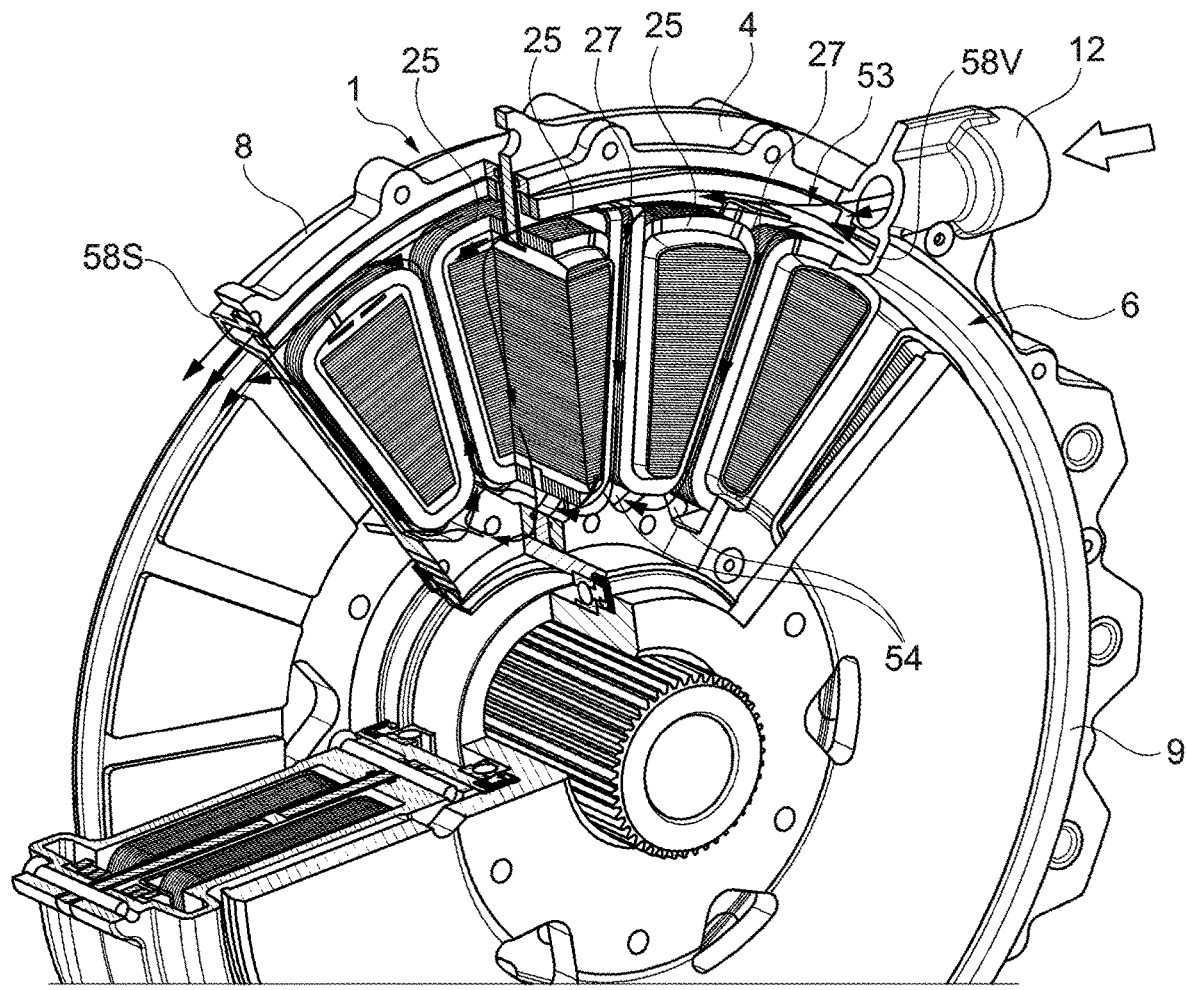
FIG. 31 shows a partial perspective view of the axial flux machine with parts broken away to show the internal structure.

FIG. 31 shows a partial perspective view of the axial flux machine 1, in which parts have been broken away in order to clarify the internal structure and a cooling agent flow 53 (flow path of the cooling medium) in the stator 6. The cold cooling medium (e.g., oil) reaches the second half of the interior of the stator 6 via the second connection 12 of the second, right stator cover 9. The circumferential distribution channel 58V of the second, right stator cover 9 ensures that the "fresh" cooling medium reaches all coils 25 in equal measure. The design of the stator 6 provides that each coil 25 is spaced apart from its neighboring coils 25 such that there is always a gap 27 between two coils 25. The cooling medium now flows through these gaps 27 from radially outside to radially inside. Arriving radially inside, the cooling medium passes through the provided flow opening 54 of the central support flange 4 into the first stator half $6_1$ of the stator 6, to flow radially outwards again from here through the gaps 27 between the coils 25 of the second stator half $6_2$ of the stator 6.

The meanwhile heated cooling medium then reaches the first connection 11 (not visible) of the first, left stator cover 8 via the collection channel 58S of the first, left stator cover 8.

The embodiment of the disclosure described above was designed as an axial flux machine 1 with regard to absolute tightness (i.e., for a dry application). For an embodiment of the application of the axial flux machine 1 in a wet area (e.g., integrated in the transmission), the transmission oil could be used as the cooling medium. Consequently, many of the sealing geometries 56 or sealants 57, such as the adhesive joints of the two stator covers 8 and 9, could be omitted. The axial flux machine 1 (motor) would then have certain leaks, but the targeted flow path of the cooling medium through the interior of the stator 6 would be retained.

It is believed that the present disclosure and many of the advantages noted therein will be understandable from the preceding description. It will be apparent that various changes in the shape, construction and arrangement of the components can be made without departing from the disclosed subject matter. The form described is illustrative only and it is the intent of the appended claims to comprise and incorporate such changes. Accordingly, the scope of the disclosure should be limited only by the appended claims.

LIST OF REFERENCE SYMBOLS

1 Axial flux machine
2 First rotor disk
3 Second rotor disk
4 Central support flange
4A First lateral face
4B Second lateral face
5 Drive shaft
6 Stator
$6_1$ First stator half
$6_2$ Second stator half
7 Connection bore
8 First, left stator cover
9 Second, right stator cover
10 Iron core
$10_1, 10_2, \ldots, 10_N$ Lamination
11 First connection
12 Second connection
$13_1, 13_2, 13_3$ Phase connection
$14_1, 14_2, 14_3$ Phase ring
16 Receptacle
17 Central opening
18 Ventilation opening
20 Clearance
21 Magnet
22A Outer ring
22B Inner ring
23 Coil unit
25 Coil 27 Gap
30 Bearing sleeve
31 Alignment pin
32 Bearing
33 Side lateral face
33O Upper lateral face
33U Lower lateral face
34 Groove
35 Insulator
36 Window cutout
37 Web
38 Air gap
40 Securing element
41 Positioning element
42 Counterpart
45 Plastic
50 Hub
52 Laser seam
53 Cooling agent flow
54 Flow opening
56 Seal geometry
$56_1$ First circumferential elastomer seal
$56_2$ Second circumferential elastomer seal
$56_3$ Additional elastomer seal
57 Sealant
58S Collection channel
58V Distribution channel
59 Opening
60 Spoke
61 Grooves/notches
62 Screw connections
64 Cutout
A Axis
A-A Section line
B-B Section line
C-C Section line
D-D Section line
P1 Arrow
P2 Arrow
R Radial direction

The invention claimed is:

1. An axial flux machine comprising: a stator located between a first rotor disk and a second rotor disk wherein:
   a central support flange defining a first lateral face and a second lateral face and dividing the stator into a first stator half and a second stator half and having formed flow openings from the second stator half to the first stator half, the central support flange having a plurality of annular segment-like window cutouts which are separated from one another by webs and are distributed uniformly around a central opening for a hub of the stator and in which a plurality of iron cores are held centrally by a groove via the webs;
   a first, left stator cover which is mounted on the first lateral face of the central support flange and has a collection channel formed on an outer periphery; and
   a second, right stator cover which is mounted on the second lateral face of the central support flange and has a distribution channel formed on an outer circumference, wherein a cooling agent flow from the distribution channel through the flow openings to the collection channel is defined.

2. The axial flux machine according to claim 1, wherein the plurality of iron cores are supported on the central support flange and extend equally into the first stator half and the second stator half and each of the iron cores in the first stator half and the second stator half is surrounded by a wound coil in such a way that a plurality of wound coils arranged consecutively in a radial direction are each spaced apart from one another by a gap.

3. The axial flux machine according to claim 2, wherein the distribution channel of the second, right stator cover, each gap between the wound coils of the second stator half, the flow openings, each gap between the wound coils of the first stator half and the collection channel of the first, left stator cover are in fluidic communication with each other.

4. The axial flux machine according to claim 1, wherein the groove is provided with an insulator.

5. The axial flux machine according to claim 2, wherein the central support flange with the iron cores is overmolded with a plastic in such a way that the plastic rests against both sides of an outer ring, on the webs and on both sides of an inner ring of the central support flange, on an upper lateral face, on a lower lateral face and on side lateral faces of the iron cores and flow openings in the inner ring are left exposed by the plastic.

6. The axial flux machine according to claim 5, wherein each of the wound coils has an annular segment-like shape and surrounds the iron cores overmolded with the plastic and the wound coils arranged consecutively in the radial direction define the gap which communicates with the associated flow opening in the inner ring of the central support flange.

7. The axial flux machine according to claim 1, wherein the first, left stator cover and the second, right stator cover have a plurality of sealing geometries in the form of elastomer seals, wherein a first circumferential elastomer seal is formed in a region of the outer periphery of the first, left stator cover or the second, right stator cover, a second circumferential elastomer seal in the region of an opening for the hub, and a further elastomer seal in each of receptacles for a phase connection.

8. The axial flux machine according to claim 7, wherein a plurality of screw connections which extend through the central support flange press the first, left stator cover and the second, right stator cover against each other on the central support flange.

9. The axial flux machine according to claim 7, wherein a further sealant is provided, which surrounds cutouts of the first, left stator cover and the second, right stator cover defined by spokes.

* * * * *